(No Model.)

E. P. BARRETT & J. A. FORSTER.
CHECK ROW CORN PLANTER.

No. 300,557. Patented June 17, 1884.

WITNESSES:
Chas. Niela
C. Sedgwick

INVENTOR:
J. A. Forster
E. P. Barrett
BY Munn & Co.
ATTORNEYS.

United States Patent Office.

EDWARD P. BARRETT AND JOHN A. FORSTER, OF HOLDEN, MISSOURI.

CHECK-ROW CORN-PLANTER.

SPECIFICATION forming part of Letters Patent No. 300,557, dated June 17, 1884.

Application filed November 22, 1883. (No model.)

*To all whom it may concern:*

Be it known that we, EDWARD P. BARRETT and JOHN A. FORSTER, of Holden, Johnson county, Missouri, have invented a new and useful Improvement in Check-Row Corn-Planters, of which the following is a full, clear, and exact description.

Reference is to be had to the accompanying drawings, forming part of this specification, in which similar letters of reference indicate corresponding parts in all the figures.

Figure 1:
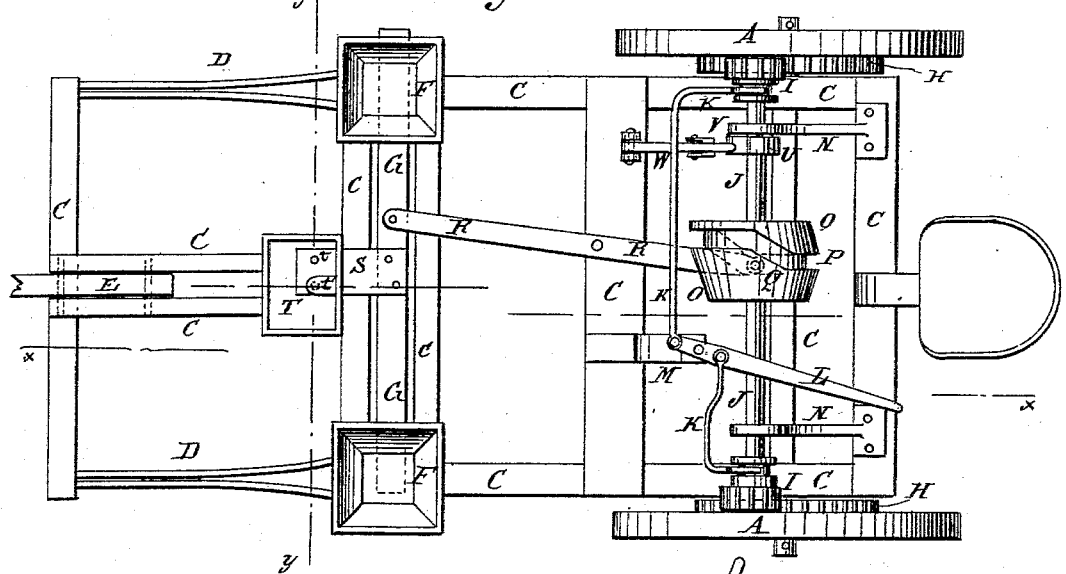
Figure 2:
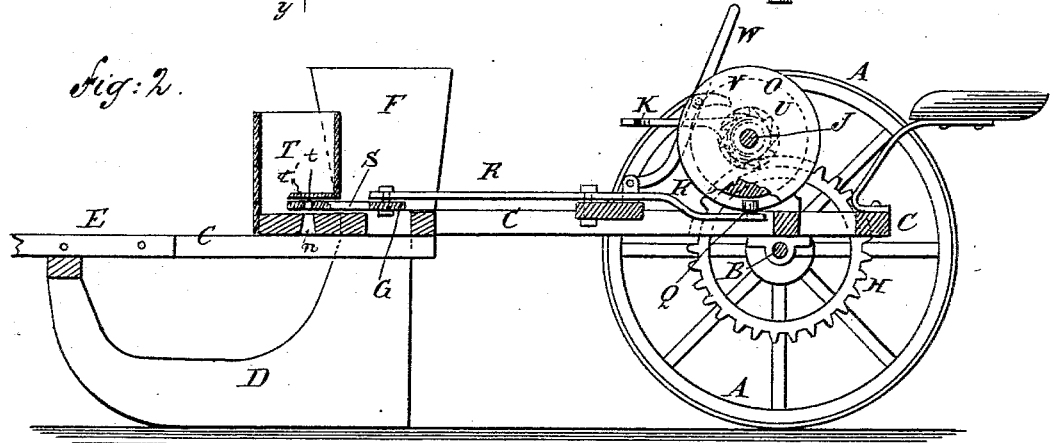
Figure 3:
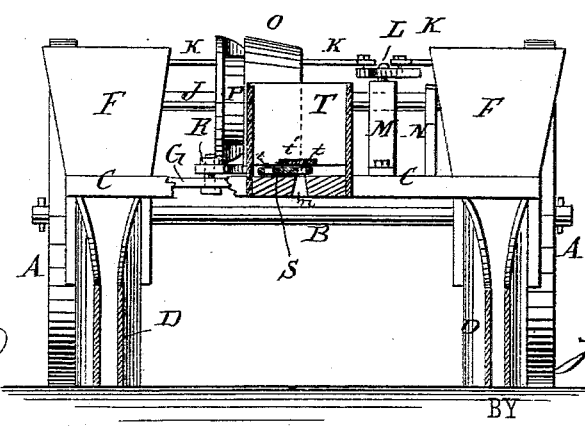

Figure 1 is a plan view of a corn-planter to which our improvement has been applied. Fig. 2 is a sectional side elevation of the same, taken through the broken line *x x*, Fig. 1; and Fig. 3 is a sectional front elevation of the same, taken through the line *y y*, Fig. 1.

Our invention relates to improvements in corn-planters; and it consists in the peculiar construction and arrangement of the parts, as hereinafter more fully set forth, and pointed out in the claims.

A represents the wheels, B the axle, C the frame, D the runners, E the tongue, F the seed-hoppers, and G the seed-dropping slide, of any ordinary corn-planter.

To the wheels A are secured gear-wheels H, into the teeth of which mesh the teeth of the gear-wheels I, placed upon the ends of the shaft J, and connected with the said shaft by tongues and grooves or other suitable means. Upon the inner ends of the hubs of the gear-wheels I are formed annular grooves to receive the forked outer ends of the rods K, the inner ends of which are pivoted to the lever L upon the opposite sides of and equally distant from the pivoting-point of the said lever. The lever L is pivoted to a support, M, attached to the frame C, and its rear end projects into such a position that it can be readily reached by the driver from his seat and operated to throw the gear-wheels into and out of gear. The shaft J revolves in bearings in supports N, attached to the frame C, and to its middle part is attached a wide wheel or cylinder, O, in the face of which is formed a cam-groove, P, to receive the pin Q, attached to the end of the lever R, the friction between the pin Q and the sides of the groove P being lessened by a small roller placed upon the said pin.

The lever R at its middle part is pivoted to a cross-bar of the frame C, and is pivoted at its forward end to the seed-dropping slide G, so that the said slide will be operated to drop the seed by the advance of the machine.

To the center of the seed-dropping slide G is attached the rear end of an arm, S, the forward end of which enters a slot in a hopper, T, and has holes *t* formed in it to receive lime, plaster, white sand, or other white substance from the said hopper and drop it through a hole, *n*, in the hopper-bottom to the ground.

*t'* represents an arm attached to the inside of the hopper near its bottom, and projecting into its interior over the arm S, to relieve the latter from a part of the weight of the lime in the hopper. One of the holes *t* not under the arm *t'* will be filled with lime, which, in the reciprocation of the arm S, will be carried over the hole *n* in the bottom of the hopper, from whence it will be dropped on the ground. The hopper T is attached to the center bars of the forward part of the frame C, a little in front of the line of the hoppers F, and in such a position that the white substance dropped from it will fall upon the ground midway between and in a line with the hills, so as to mark the cross rows, and thus enable the driver to plant the corn in accurate check-row.

To the shaft J is attached a ratchet-wheel, U, with the teeth of which engages a pawl, V, attached to a lever, W. The lower end of the lever W is pivoted to a cross-bar of the frame C, and its upper end projects into such a position that it can be readily reached and operated by the driver from his seat to adjust the seed-dropping mechanism when starting in at the side of the fields, and at any time when the cross-rows get out of true, so that the planting can be done in accurate check-row.

We are aware that a lime-hopper for marking purposes has been arranged between the seed-hoppers of a corn-planter, and that the lime has been discharged therefrom by means of an arm connected with the seed-slide, and we therefore lay no claim, broadly, to such invention.

Having thus described our invention, we claim as new and desire to secure by Letters Patent—

1. In a corn-planter, the combination, with the reciprocating seed-slide G, of the slotted lime-hopper T, provided with the aperture $n$ in its bottom, and rigid arm $t'$, projecting inwardly over the aperture $n$, and the arm S, provided with holes $t\ t$, and rigidly secured to the seed-slide, and projecting into the lime-hopper, substantially as herein shown and described.

2. In a corn-planter, the combination, with the frame C, wheels A, provided with the gear-wheels H, shaft J, carrying the gear-wheels I, and wheel O, having the cam-groove P, lever R, seed-slide G, and hoppers F, of the arm S, secured to the middle of the seed-slide, and provided near its outer end with the holes $t\ t$, and the slotted hopper T, provided with a hole, $n$, in its bottom, and inwardly-projecting arm $t'$, substantially as shown and described.

EDWARD P. BARRETT.
JOHN A. FORSTER.

Witnesses:
S. T. ALLEN,
J. PERR.